United States Patent [19]

Terpin

[11] Patent Number: 5,841,227
[45] Date of Patent: *Nov. 24, 1998

[54] RADIATION SHIELD WITH OPAQUE AND TRANSPARENT PORTION

[76] Inventor: David J. Terpin, 1054 S. Holt Ave., Los Angeles, Calif. 90035

[*] Notice: This patent issued on a continued prosecution application filed under 37 CFR 1.53(d), and is subject to the twenty year patent term provisions of 35 U.S.C. 154(a)(2).

[21] Appl. No.: 590,535

[22] Filed: Jan. 24, 1996

[51] Int. Cl.$^6$ ..................................................... H04H 5/65
[52] U.S. Cl. ........................... 313/479; 313/313; 348/819; 174/35 MS; 315/85
[58] Field of Search .................................... 313/466, 478, 313/479, 402, 407, 313; 348/819; 174/35 MS, 35 R; 315/85

[56] References Cited

U.S. PATENT DOCUMENTS

| | | | |
|---|---|---|---|
| 4,468,702 | 8/1984 | Jandrell | 358/245 |
| 4,785,136 | 11/1988 | Mollet et al. | 174/35 R |
| 4,853,790 | 8/1989 | Dickie | 348/819 |
| 4,856,101 | 8/1989 | Jonsson et al | 358/245 |
| 4,864,190 | 9/1989 | Orr | 313/478 |
| 4,905,089 | 2/1990 | Liang et al. | 358/247 |
| 4,910,090 | 3/1990 | Kuhlman et al. | 174/35 MS |
| 5,030,882 | 7/1991 | Solero | 313/478 |
| 5,059,961 | 10/1991 | Cheng | 340/720 |
| 5,076,665 | 12/1991 | Petersen | 359/809 |
| 5,095,385 | 3/1992 | Stroll, Jr. | 359/609 |
| 5,122,619 | 6/1992 | Dlubak | 174/35 R |
| 5,136,434 | 8/1992 | Katz | 359/862 |
| 5,155,627 | 10/1992 | Keehn et al. | 359/609 |
| 5,200,859 | 4/1993 | Payner et al. | 359/857 |
| 5,204,750 | 4/1993 | Ferraroni | 358/247 |
| 5,256,960 | 10/1993 | Novini | 324/72 |
| 5,328,145 | 7/1994 | Charapich | 248/442.2 |
| 5,459,527 | 10/1995 | Lin | 348/819 |

OTHER PUBLICATIONS

Undated 2 page brochure for Vu–tek Vision Care Superview polarizing filters.

Undated 2 page brochure for NoRad JitterBox.

Undated 2 page brochure for PEN Screen Box.

*Primary Examiner*—Sandra L. O'Shea
*Assistant Examiner*—Michael Day
*Attorney, Agent, or Firm*—Fulbright & Jaworski L.L.P.

[57] ABSTRACT

An auxiliary radiation shield for a CRT-type video display terminal includes a generally flat front portion having an at least partially transparent conductive central shield and an opaque frame-like conductive outer shield surrounding the central shield, with the transparent central shield having an area substantially equal to that of the faceplate of the CRT and the opaque outer shield having an area at least equal to that of the transparent central shield, whereby when the radiation shield is supported in front of the CRT with the transparent central shield disposed directly in front of the faceplate, the transparent central shield is in the path of the electrical field that would otherwise extend through the faceplate towards any user in front of the CRT, and the opaque outer shield intersects a substantial portion of the electrical fields that would otherwise extend from the sides and top of the CRT towards that user. Preferably, both the central shield and the outer frame are not only electrically conductive but are also connected to ground, thereby providing an alternate return path for electrical charges that would otherwise pass from the monitor to the user. In at least one presently contemplated embodiment, at least the opaque shield portion is not only electrically conductive (high permittivity), but also magnetically conductive (high permeability) whereby a significant portion of the electromagnetic radiation that is not reflected is propagated within the shield until it is eventually absorbed and dissipated. The absorption can be further enhanced by including an extension of the outer shield that is oriented parallel to the direction of propagation.

15 Claims, 5 Drawing Sheets

1

RADIATION SHIELD WITH OPAQUE AND TRANSPARENT PORTION

TECHNICAL FIELD

The present invention relates generally to video display terminals, and more particularly to shields for protecting the user from various types of radiation emitted by such terminals.

BACKGROUND ART

Electro-magnetic radiation and static electric fields such as are produced by power transmission lines, microwave ovens, cathode ray tubes, and other electrical devices are believed to pose environmental hazards to persons in the immediate vicinity of such devices, and may cause increased risk of cancers and abnormal pregnancies. As detailed in U.S. Pat. No. 5,256,960 and the various references cited therein, a CRT type computer monitor can be a significant source of extremely low frequency (ELF) and very low frequency (VLF) electromagnetic radiation, on the order of 70 milligauss (mG) at a distance of 4" from the sides and tops of the monitor cabinet, and 22 mG at the same distance from the front of the monitor. Electronic devices such as computer monitors can also produce high frequency microwave radiation as well as static electrical fields.

Even if the CRT or other device is operating within what are currently believed to be acceptable radiation limits, many users insist on a higher level of protection to compensate for the possibility that the equipment is defective or is improperly installed, or that the user is closer than the manufacturer intended, or that the user is particularly vulnerable to the particular radiation being emitted. Moreover, many individuals and organizations believe that even a statistically insignificant health hazard is unacceptable if it can be easily avoided.

The prior art includes a number of devices for shielding the user of a CRT type computer monitor or other similar display device from electrical and electromagnetic fields emanating from the monitor's interior.

Typically, such devices include a conductive mesh or film applied to the faceplate of the CRT as exemplified by U.S. Pat. Nos. 4,856,101 and 4,468,702, or held in front of the CRT in a frame supported by the housing containing the CRT as exemplified by U.S. Pat. No. 5,204,750.

Mounting boards and glare shields are known, as exemplified by U.S. Pat. Nos. 5,095,385 and 5,328,145, which are adapted to be attached in front of the faceplate of a video display terminal, with a central opening through which the image on the monitor is visible, and an opaque outer frame which extends above and to one or both sides of the monitor with optional shutter panels, on which reference material and decorations can be placed permanently or temporarily.

The prior art also includes a box-like cabinet or tunnel formed of a conductive material which surrounds the monitor on at least four sides as exemplified by U.S. Pat. No. 5,136,434, and a four sided-box formed of a material having a high magnetic permeability which is placed on the top, bottom and sides of the monitor to protect its internal components from external ELF magnetic fields.

DISCLOSURE OF INVENTION

In its broadest aspect, the invention includes an auxiliary radiation shield for a CRT-type video display terminal that includes a generally flat front portion having an at least partially transparent conductive central shield and an opaque frame-like conductive outer shield surrounding the central shield, with the transparent central shield having an area substantially equal to that of the faceplate of the CRT and the opaque outer shield having an area at least equal to that of the transparent central shield, whereby when the radiation shield is supported in front of the CRT with the transparent central shield disposed directly in front of the faceplate, the transparent central shield is in the path of the electrical field that would otherwise extend through the faceplate towards any user in front of the CRT, and the opaque outer shield intersects a substantial portion of the electrical fields that would otherwise extend from the sides and top of the CRT towards that user. Since the shield is conductive, a substantial portion of any electromagnetic radiation originating inside the monitor and intersected by the shield would be reflected away from the user and back towards the monitor. The blocking effect can be further enhanced by including an extension of the outer shield that increases the solid angle that is subtended relative to the source of the radiation.

Preferably, both the central shield and the outer frame are not only electrically conductive but are also connected to ground, thereby providing an alternate return path for electrical charges that would otherwise pass from the monitor to the user. In at least one presently contemplated embodiment, at least the opaque shield portion is not only electrically conductive (high permittivity), but also magnetically conductive (high permeability) whereby a significant portion of the electromagnetic radiation that is not reflected is propagated within the shield until it is eventually absorbed and dissipated. The absorption can be further enhanced by including an extension of the outer shield that is oriented parallel to the direction of propagation.

In accordance with the invention, there is thus provided a simple and effective shield for substantially reducing various types of electrical and electro-magnetic radiation extending from not only the front of a CRT but also from its sides and top.

PREFERRED MODE FOR PRACTICING THE INVENTION

Figure 1:
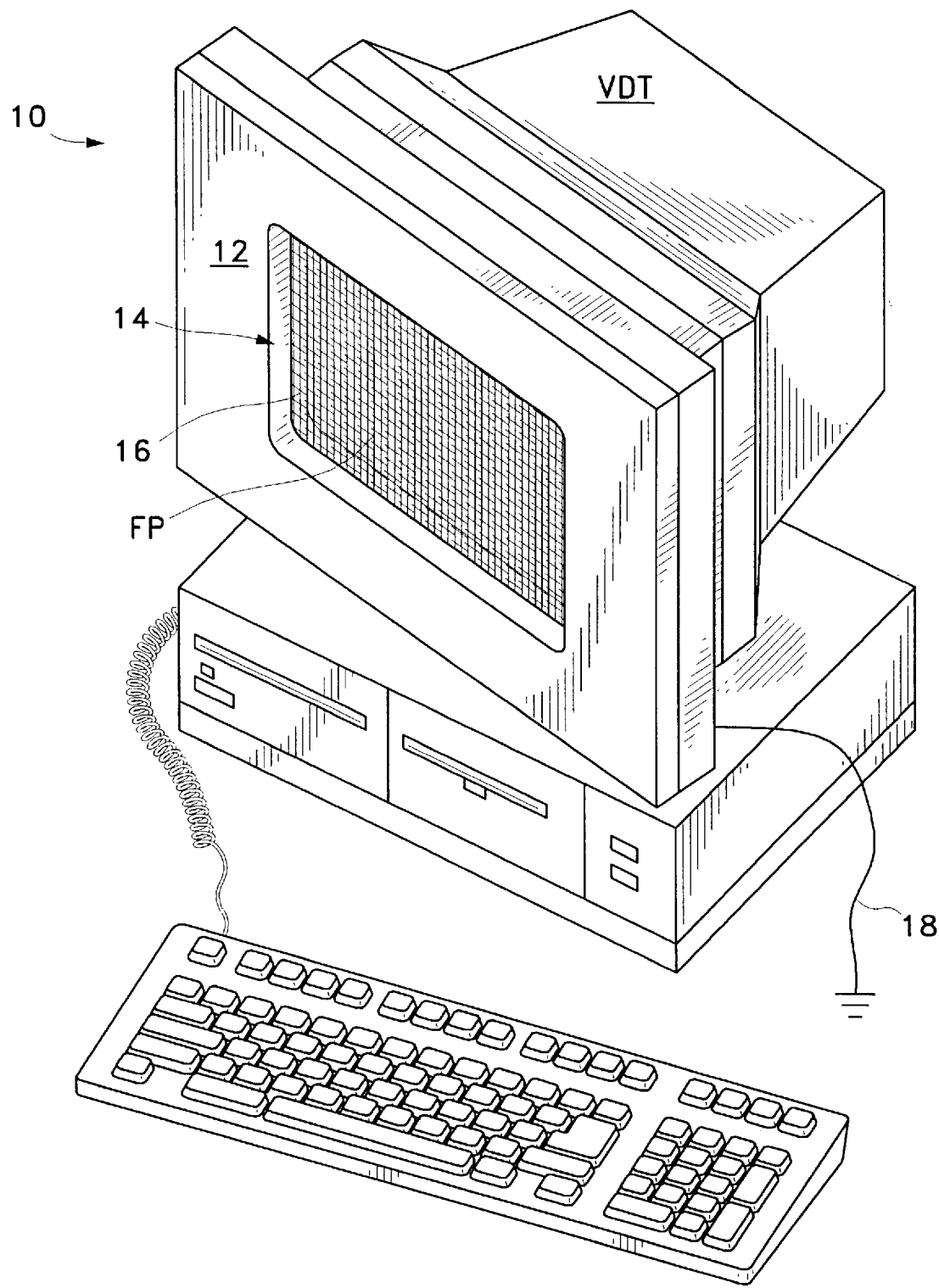
FIG. 1 shows a first embodiment of the shield in use in front of a conventional video display terminal.

Referring now to FIG. 1, it will be seen that the shield 10 of the present invention has an external appearance similar to prior art glare and radiation shields; however, its total area is substantially larger and as a result, it subtends a substantially larger solid angle with respect to an origin point (for example, point O in FIG. 3) than shields which cover only the faceplate FP. Preferably, the area of the outer frame 12 is at least equal to that of the transparent portion 14 over the faceplate FP. In an exemplary embodiment, the dimensions of the transparent central portion were 9×12 inches (for a central area of 108 in$^2$) and the outer dimensions of the frame were 13×18½, for an outer frame area of 132½ in$^2$.

Central portion 14 is preferably formed of a mesh-like black nylon material 16 (such as Nitex) containing conductive fibers (such as Resistat from BASF), which not only acts as a neutral density filter which allows the monitor VDT to operate with a brighter and thus higher contrast image, but also as a conductive radiation shield which is connected to ground via ground wire 18.

In accordance with the invention, the shield also includes a conductive outer frame which is similar in appearance to certain prior art prior art mounting boards and glare guards, but which has the added advantage of substantially increasing the effective electromagnetic and electrostatic shielding effect of the prior art screen mounted radiation shields by a factor of 2:1 or even higher. The relatively large area provided by the outer frame is not only functional as a radiation shield, but can also serve to increase the apparent contrast and brightness of the screen FP by providing a suitably colored background to the displayed image. Alternatively, it can be used as a mounting surface for notes, instructions, decorations or other text or graphics that the user may wish to refer to while using the computer monitor VDT. Attachment of the shield 10 to the monitor VDT in the illustrated embodiment is by means of a simple hook and loop fastener 20 at each corner X of the front surface of the monitor VDT; however those skilled in the art will realize that the shield could be permanently attached in front of the monitor VDT by conventional fixed fastening means such as rivets and/or adhesives, or temporarily by other conventional removable fastening means such as screws, clips or brackets.

Ground wire 18 is electrically connected at one end to both the conductive mesh 16 and the conductive frame 12 by means of a conventional metal rivet 22 (FIG. 2) connecting the mesh to the frame; however other conventional electrical connection means such as conductive adhesives, crimped connectors, spring clamps or the like could also be used. Alternatively, the separate electrical connection to the frame could be eliminated if the area covered by the conductive mesh were made coextensive with the outer dimensions of the frame (in which case the mesh could be the only conductive portion of the frame and the electrical connection would be made directly to the mesh) or if the edges of the conductive mesh were clamped tightly against a conductive surface on the frame.

Figure 2:
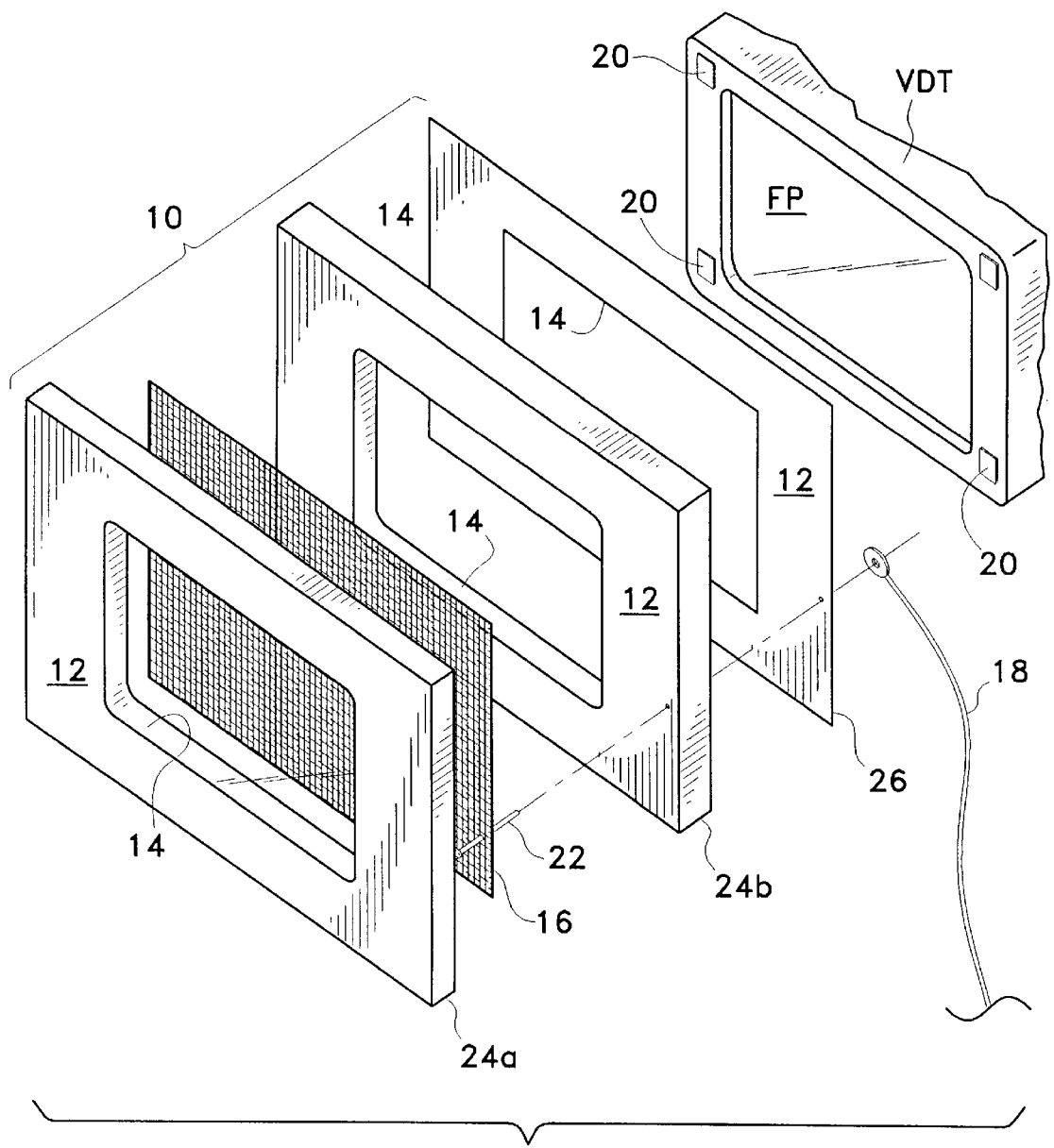
FIG. 2 is an exploded view of the shield of FIG. 1 showing the details of its construction

As shown in more detail in FIG. 2, the frame 12 is preferably constructed from one or more layers 24 of a relatively inexpensive insulating material such as cardboard or foamed plastic to provide a self-supporting structure that is relatively light in weight, but nevertheless sufficiently rigid that it will not collapse as a result of gravity or tensile forces from conductive mesh fabric. A layer of aluminum, silver or copper foil 26 is applied to one of the layers forming the frame to give it the desired conductive property. An exemplary prototype was made of two layers of 70 point chip board and a single layer of 10 point aluminum foil board, with the latter including a 0.35 mil layer of aluminum foil. Such a form of construction provides a sandwich approximately 0.25 inches thick and having the desired electrical (conductive) and mechanical (rigid) properties in a more cost efficient manner than a frame formed from a solid piece of metal, or a frame formed of insulating material in which the conductive properties are provided by the relatively expensive conductive mesh material even in the outer regions where a transparent material is not required.

Those skilled in the art will recognize that a unitary form of construction would also be possible in which the solid frame 12 and transparent mesh 16 were replaced by a molded sheet of transparent insulating material such as glass, acrylic or polystyrene, with at least the central portion 14 having a transparent conductive coating (such as tin oxide) and the opaque outer portion 12 having either an opaque conductive coating (such as aluminum) or both a transparent conductive coating and an opaque non-conductive coating (such as enamel paint). Alternatively, conductive and/or opaque additives could be selectively embedded within the transparent material, or an insulative substrate could be printed with a predetermined pattern of an ink having the desired electrical and magnetic characteristics to form an integrated structure having the desired mechanical, electrical, magnetic and optical properties. Such an alternate construction can include anti-reflective coatings and polarizing filters to further reduce glare, in a manner known to those skilled in the art.

Figure 3:
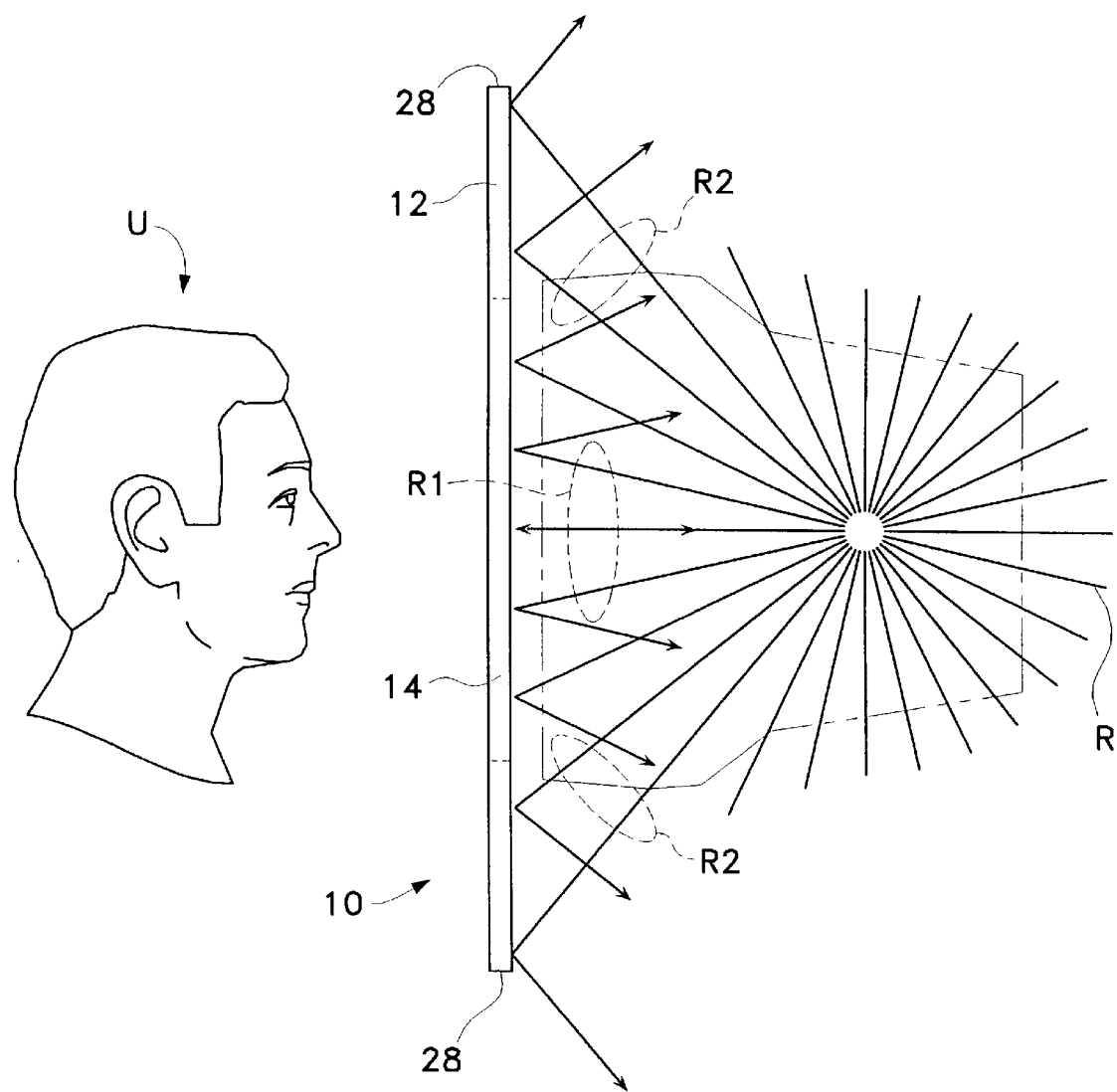
FIG. 3 shows how a generally flat shield will reflect (or intercept) diverging rays of radiation from a point source inside the monitor.

Referring now to FIG. 3, which is a conceptual representation of the geometrical relationship of the shield 10 to the rays R of radiation from an imaginary origin point O within the monitor VDT, it will be seen that the grounded shield is in the path of not only the radiation R1 through the faceplate, but also a substantial portion of the radiation R2 that is emitted in the general direction of the user U from the sides of the monitor VDT, and acts as a reflector to reflect a substantial portion of that radiation away from the user. Indeed, although the frame portion 12 of the shield is further away from the origin O than the central portion 14 and thus, for a given area, subtends a smaller solid angle, nevertheless the increased area provided by the frame 12 intercepts a substantial amount of radiation that would otherwise impinge on the user. In that regard, it should be understood that although the diagram assumes the radiation will travel in a straight line, in fact it will tend to turn the corner at the edge 28 of the shield 10 and continue toward the user U. However, because a large portion of the radiation is reflected away from the user, and because the radiation that does reach the user U travels a longer path, there is a substantial reduction in the intensity of the radiation that reaches the user. Depending on the geometry and the particular permittivity and permeability of the materials used in the construction of the shield 10, some or all of the electromagnetic radiation in its vicinity will not be reflected, but will actually be absorbed, with the greatest potential for absorption occurring at the outer portions of the frame where the rays impinge at a relatively low angle and thus propagate a longer distance through the shield. In at least one presently contemplated embodiment, at least the opaque shield portion not only is electrically conductive (high permittivity) but also is magnetically conductive (high permeability), whereby at least some of the electromagnetic radiation that impinges on the shield is not reflected but is propagated within the shield until it is eventually absorbed and dissipated.

Figure 4:
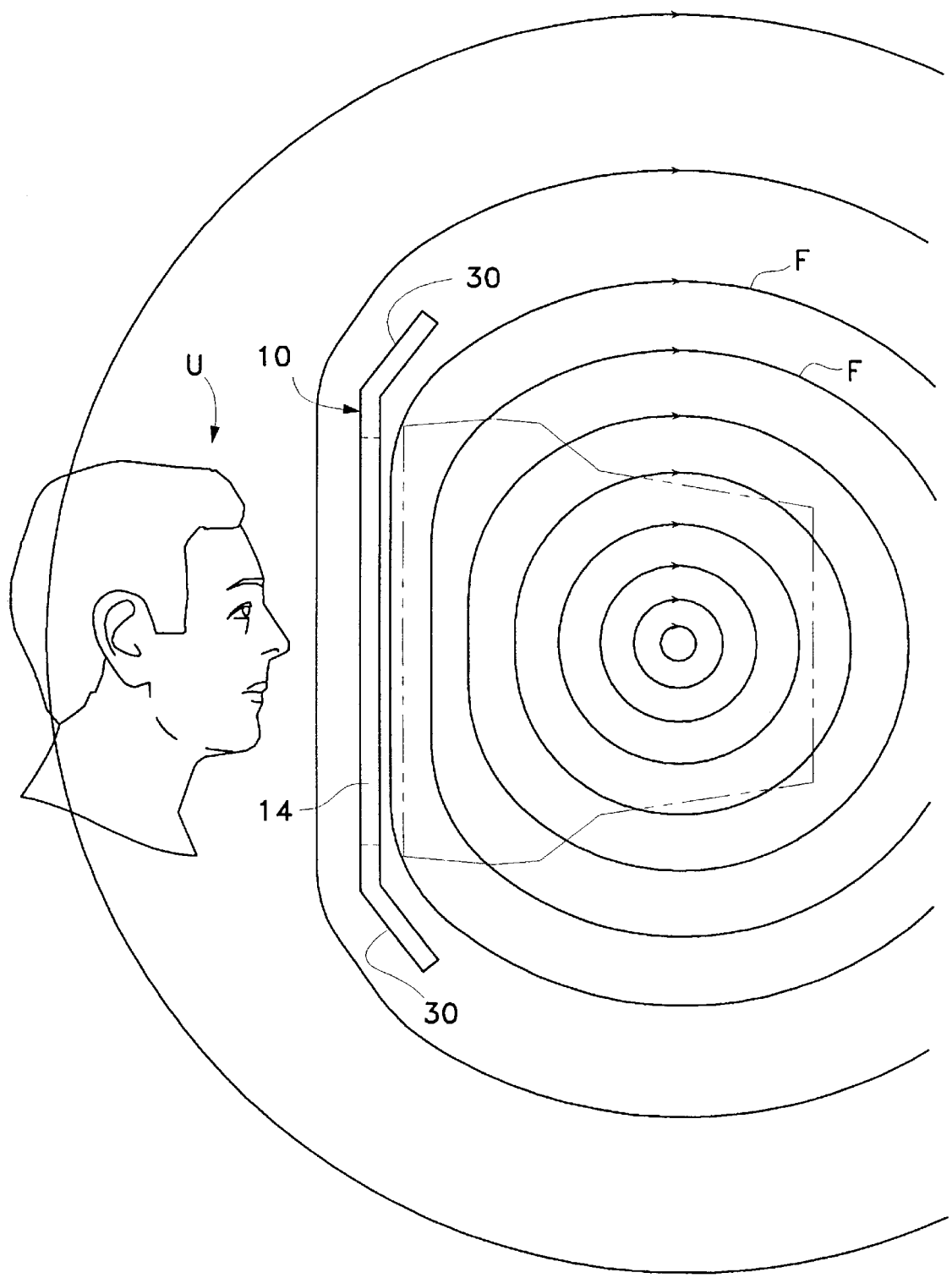
FIG. 4 shows how a second embodiment of a shield with extensions on one or more sides may be oriented to concentrate the electro-magnetic energy behind the shield.

FIG. 4 shows an alternate embodiment of the shield of FIG. 3, wherein the outer edges of the shield are in the form of rearwardly facing extensions 30. Rather than individual rays R, the radiation is depicted in the form of lines of force F, with the highest intensity corresponding to the closely spaced lines at the origin point O and behind the shield 10, and the lowest intensity corresponding to the far apart lines in the vicinity of the user U.

Figure 5:
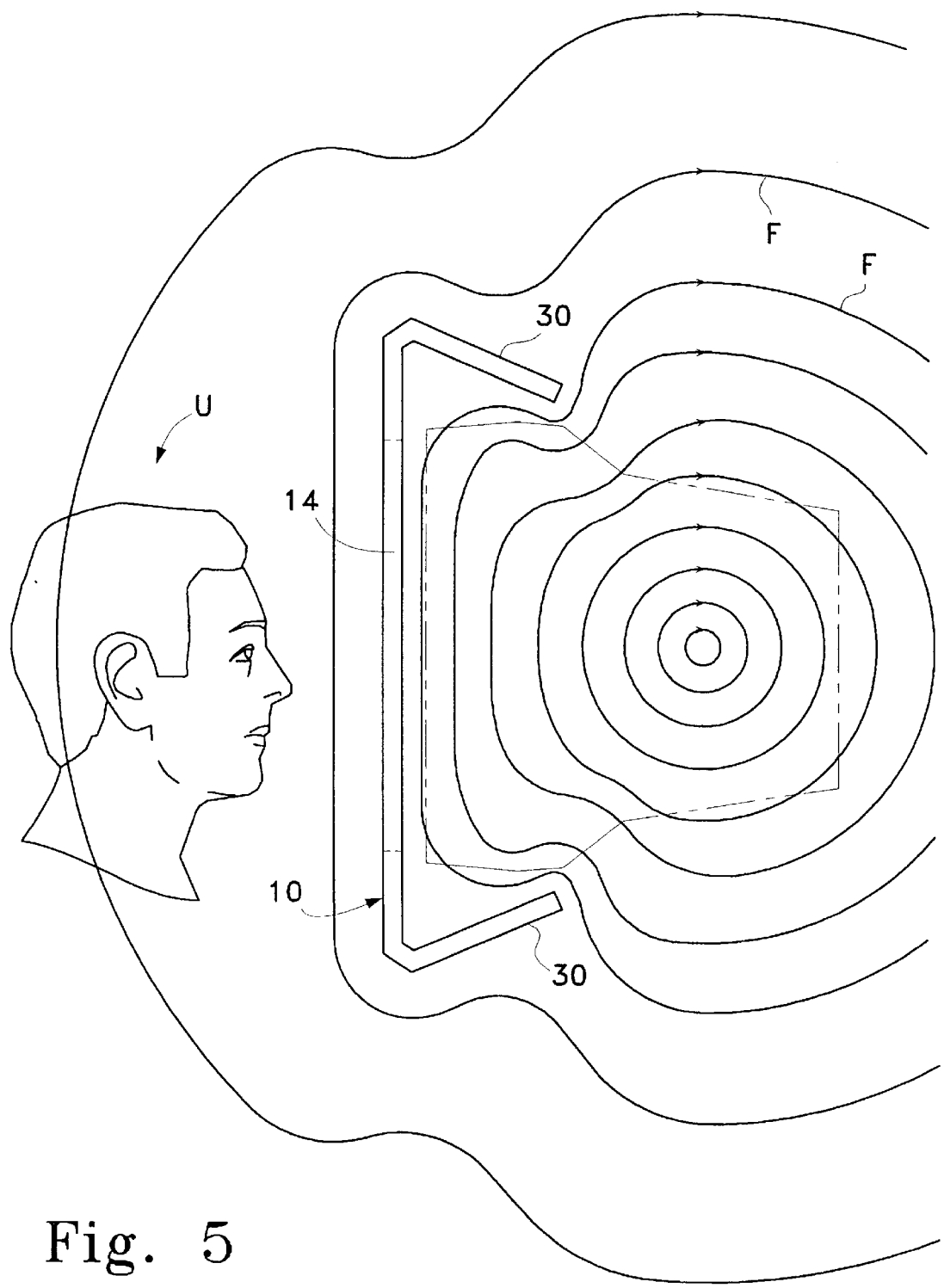
FIG. 5 shows a third embodiment in which the extensions are oriented in the direction of propagation of the electro-magnetic energy to absorb the electromagnetic energy.

FIG. 5 is generally similar to FIG. 4, but shows the extensions 30 aligned perpendicular to the lines of force (ie, parallel to the direction of propagation) whereby maximum absorption may be achieved. From FIGS. 4 and 5, it will be appreciated that some orientations of the shield are optimal for absorption, while others are optimal for reflection.

Again referring to FIG. 4, but considering the effects of static electrical forces such as may be caused by the build-up of electrical charges on various external surfaces of the monitor, it will be realized that the greater the solid angle subtended by the shield 10 relative to the origin O, the greater the probability that a charge at that point will be attracted to the shield. Thus, the larger solid angle subtended by shield 10 not only provides a larger protected area in front of the shield, but also increases the probability that any particular charge will be intercepted, thereby providing additional protection from static electricity even for a person at the sides of, or behind, the monitor VDT.

It is understood that the above-described embodiment is merely provided to illustrate the principles of the present invention, and that other embodiments may readily be devised using these principles by those skilled in the art without departing from the scope and spirit of the invention.

What is claimed is:

1. An auxiliary radiation shield for mounting in front of a faceplate of a CRT-type video display terminal, comprising:
    a conductive planar central shield portion that is transparent to visible light, that has an area at least equal to that of the faceplate, and that is adapted to be disposed in front of the faceplate, to thereby block any electrical or electromagnetic radiation from the faceplate towards any user in front of the video display terminal but not block any visible image then being displayed on the CRT-type video display, and
    a conductive planar outer shield portion that is opaque to visible light, that surrounds and is coplanar with the central shield portion, and that is adapted to extend above and to either side of the video display terminal, to thereby block at least a portion of any electrical or electromagnetic radiation from the sides and top of the video display terminal towards that user and also enhance the visibility of said visible image,
wherein the planar outer shield portion has an area at least equal to that of the planar central shield portion and the outer shield portion has height and width dimensions greater than the corresponding dimensions of the video display terminal.

2. The shield of claim 1, wherein at least a portion of said radiation is reflected away from the user and back towards the video display terminal.

3. The shield of claim 1, wherein at least a portion of said radiation is absorbed within the shield.

4. The shield of claim 1, wherein at least a portion of said radiation is deflected away from the user.

5. The shield of claim 1, wherein said shield further comprises an opaque conductive extension that is separate from and supported by said outer shield portion and that is angled rearwardly away from the user and towards the video display terminal, at a non-perpendicular angle relative to the planar outer shield portion.

6. The shield of claim 5, wherein said extension is oriented generally perpendicular to a direction of propagation of a portion of said radiation adjacent the extension.

7. The shield of claim 5, wherein said extension is oriented generally parallel to a direction of propagation of a portion of said radiation adjacent the extension.

8. The shield of claim 1, wherein both the central shield portion and the outer shield portion are electrically connected to a ground.

9. The shield of claim 1, wherein the outer shield portion comprises two insulating layers and a metallic layer, said central shield portion is formed from a sheet of a conductive mesh material, and the outer edges of said sheet are clamped between two of said layers.

10. The shield of claim 1, wherein:
    said central shield portion comprises a sheet of a conductive mesh material,
    said outer shield portion portion comprises two insulating layers and a metallic layer, and
    said shield further comprises
        means for clamping an outer edge of said sheet between two of said layers,
        means for supporting said shield in front of the video display terminal with the transparent central shield portion disposed directly in front of the faceplate with a portion of the conductive outer shield portion extending above and to either side of the video display terminal,
    means for making an electrical connection between said sheet, said metallic layer, and ground, and
    an opaque conductive extension that is separate from and supported by said opaque conductive outer shield portion and that is oriented at an angle rearwardly away from the user and towards the video display terminal, at a non-perpendicular angle relative to the planar outer shield portion.

11. The shield of claim 10 wherein at least a portion of said radiation is reflected away from the user and back towards the video display terminal.

12. The shield of claim 10, wherein at least a portion of said radiation is absorbed within the shield.

13. The shield of claim 10, wherein at least a portion of said radiation is deflected away from the user.

14. The shield of claim 10, wherein said extension is oriented generally perpendicular to a direction of propagation of a portion of said radiation adjacent the extension.

15. The shield of claim 10, wherein said extension is oriented generally parallel to a direction of propagation of a portion of said radiation adjacent the extension.

* * * * *